United States Patent
Meandzija et al.

(10) Patent No.: US 6,839,070 B2
(45) Date of Patent: Jan. 4, 2005

(54) REAL-TIME DISPLAY OF BANDWIDTH UTILIZATION IN A TRANSPORT MULTIPLEXER

(75) Inventors: Branislav N. Meandzija, Del Mar, CA (US); Ying Ying Tsay, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 61 days.

(21) Appl. No.: 10/124,407

(22) Filed: Apr. 16, 2002

(65) Prior Publication Data

US 2003/0001897 A1 Jan. 2, 2003

Related U.S. Application Data

(60) Provisional application No. 60/285,188, filed on Apr. 20, 2001, and provisional application No. 60/285,153, filed on Apr. 20, 2001.

(51) Int. Cl.[7] .................................................. G09G 5/00
(52) U.S. Cl. .................... 345/736; 345/440.2; 345/726; 345/772; 709/223; 709/224; 715/500.1
(58) Field of Search ................................. 345/716, 719, 345/722, 726, 736, 772, 440.2; 715/500.1; 709/223, 224

(56) References Cited

U.S. PATENT DOCUMENTS

| | | |
|---|---|---|
| 5,611,038 A | 3/1997 | Shaw et al. |
| 5,615,323 A | 3/1997 | Engel et al. |

(List continued on next page.)

FOREIGN PATENT DOCUMENTS

| | | |
|---|---|---|
| EP | 0 963 076 | 12/1999 |
| WO | WO 97/20413 | 6/1997 |
| WO | 99 34544 | 6/1999 |
| WO | WO 01/15455 | 3/2001 |
| WO | 01/48983 | 6/2001 |

OTHER PUBLICATIONS

Advanced Television Systems Committee (ATSC, *ATSC Standard: Delivery of IP Multicast Sessions over Broadcast*, Doc. A/92, Jan. 31, 2002, pp. 1–42.

(List continued on next page.)

*Primary Examiner*—Cao Nguyen
*Assistant Examiner*—Cuong T. Thai
(74) *Attorney, Agent, or Firm*—Barry R. Lipsitz; Douglas M. McAllister

(57) ABSTRACT

A feature-rich transport multiplexer and a number of associated methods, systems, subsystems, software features, graphical user interfaces and control systems are disclosed. The disclosure includes GUI's that enable operators to easily monitor and manipulate content streams flowing through a transport multiplexer in real-time. The disclosed interfaces include screens that supply operators with identity, structure, configuration, bandwidth utilization and/or status information for system hardware and software. The disclosed features also provide computer assisted routing configuration for present and future routing events through simple manipulation, such as drag and drop operations, of graphical objects. Routing control is further simplified by permitting operators to configure routing control of individual content stream components as well as groups of such components simultaneously. Further flexibility is permitted by predetermination of future routing events, thereby enabling the automatic execution of configuration changes at a future time. Various types of content, such as video, audio, IP data can be manipulated to achieve various results such as one or more multiplexed MPEG data streams.

12 Claims, 12 Drawing Sheets

U.S. PATENT DOCUMENTS

| | | | |
|---|---|---|---|
| 5,787,248 A | | 7/1998 | Zupcsics et al. |
| 5,825,775 A | | 10/1998 | Chin et al. |
| 5,867,483 A | | 2/1999 | Ennis, Jr. et al. |
| 5,886,995 A | * | 3/1999 | Arsenault et al. ............ 370/477 |
| 5,987,518 A | | 11/1999 | Gotwald ..................... 709/230 |
| 6,160,797 A | | 12/2000 | Robert, III et al. |
| 6,182,129 B1 | | 1/2001 | Rowe et al. |
| 6,182,249 B1 | | 1/2001 | Wookey et al. |
| 6,247,050 B1 | * | 6/2001 | Tso et al. .................... 709/224 |
| 6,490,620 B1 | * | 12/2002 | Ditmer et al. .............. 709/224 |
| 6,502,131 B1 | * | 12/2002 | Vaid et al. .................. 709/224 |

OTHER PUBLICATIONS

Mack, B., Society of Cable Telecommunications Engineers, Inc. (SCTE), *ATVEF Binding for Digital MPEG Networks*, SCTE DVS 311, Feb. 2, 2000, pp. 1–13.

Crinon, R.J, *ATSC Data Broadcast Services: Protocols, Application Signaling, Buffer Models, Profiles and Levels*, International Conference on Consumer Electronics (ICCE), IEEE, Jun. 22, 1999, pp. 4–5.

Advanced Television Systems Committee (ATSC), *ATSC Data Broadcast Standard*, Doc. A/90, Jul. 26, 2000, pp. 1–94.

Clausen, Horst D., et al., *MPEG–2 as a Transmission System for Internet Traffic*, IEEE International Performance, Computing and Communications Conference (IPCCC), Feb. 16–18, 1998, pp. 101–107.

*ATSC IP Multicast Data Standard (Draft)*, Doc. S13–12r5, Draft 05, Jan. 23, 2001, pp. i–iii, 1–13, 16, 35–36.

Terayon Communication Systems Product Brochure, *Cherrypicker 500*, Nov. 2000.

Terayon Communication Systems Product Brochure, *Cherrypicker 600*, Nov. 2000.

Terayon Communication Systems Product Brochure, *Cherrypicker Ad Splicer*, Nov. 2000.

Terayon Communication Systems Product Brochure, *Cherrypicker National Control*, Nov. 2000.

Terayon Communication Systems Product Brochure, *Cherrypicker GUI*, Apr. 2001.

Bigband Networks, Inc. Product Brochure, *BMR 100 Broadband Multimedia–Service Router for Cable Networks*, 2000.

Bigband Networks, Inc. Product Brochure, *BMR 1200 Broadband Multimedia–Service Router for Cable Networks*, 2000.

Bigband Networks, Inc. Product Brochure, *BMR Management Suite*, 2001.

Bigband Networks, Inc. Promotional Article, *The BMR–100–Next Generation Grooming*, www.bigbandnet.com/popup/bmr.htm, 3 pages, publication date unknown.

Keller, R., et al., "An Active Router Architecture for Multicast Video Distribution", IEEE INFOCOM 2000, Mar. 26, 2000, pp. 1137–1146.

Computer Automation Systems, Inc., "Integral Monitor Chassis 6U (10.5")",online 1999, pp. 1–2, XP002212597, http://www.casil.com/monitor6U.htm.

Virmani, A., et al., "Netmon: Network Management for the SARAS Softswitch", IEEE Conference 2000, pp. 803–816.

Atzori, L., et al., "Multimedia Information Broadcasting Using Digital TV Channels," IEEE Transactions on Broadcasting, vol. 43, No. 3, Sep. 1997, pp. 242–251.

* cited by examiner

FIG. 3

REAL-TIME DISPLAY OF BANDWIDTH UTILIZATION IN A TRANSPORT MULTIPLEXER

CROSS REFERENCE TO RELATED CASES

This application claims the benefit under 35 U.S.C. 119(e) of co-pending U.S. Provisional Application No. 60/285,188 filed Apr. 20, 2001 and entitled "Broadband Bandwidth Management, Device Management and Multi-Media Control System"; and No. 60/285,153 filed Apr. 20, 2001 and entitled "Data Insertion, Transport, Grooming, Aliasing, Routing, and Multiplexing of MPEG 2 Data Streams", which Provisional Applications are hereby incorporated by reference.

This application is related to co-pending U.S. patent application Ser. No. 10/124,610, filed Apr. 16, 2002 (based on provisional application No. 60/322,063 filed Sep. 13, 2001) and entitled "High Speed Serial Data Transport Between Communications Hardware Modules," which Application is hereby incorporated by reference.

REFERENCE TO COMPUTER PROGRAM

This application hereby incorporates by reference a computer program listing submitted concurrently herewith on two duplicate compact discs pursuant to the provisions of 37 C.F.R. §1.52(e)(5). One complete copy of the computer program listing is provided on each of the accompanying compact discs and the discs have been labeled "Copy 1 REPLACEMENT Jul. 11, 2002" and "Copy 2 REPLACEMENT Jul. 11, 2002" as required by 37 C.F.R. § 1.52(e)(4). The incorporated computer program listing is contained in a single file consisting of 63 kilobytes named "mib tables-appendix.txt" which was created on Jul. 11, 2002 by conversion to ASCII text of the original file created on Apr. 12, 2002, named "mib tables-appendix.doc" and consisting of 150 kilobytes.

BACKGROUND OF THE INVENTION

1. Field of the Invention

The present invention is directed to systems, processes, methodologies, apparatus and related software to provide graphical user interfaces for use with communications hardware. More particularly, the invention relates to the field of graphical user interfaces that provide real-time visual display of bandwidth utilization for content streams routed through broadband media routers. Accordingly, the general objects of the invention are to provide novel systems, methods, apparatus and software of such character.

2. Description of the Related Art

Broadband media convergence between video, audio and data creates a chaotic environment of different standards and legacy communications technologies. The relationship between physical and logical resources in such systems needs to be manipulated and communicated between broadband hardware, its control system and the operator. Conventionally, this is accomplished with the use of dedicated control computers for each piece of communications hardware associated with the task of routing multimedia. Therefore, modem communications hardware personnel, such as cable operators and television programmers, use great numbers of diverse equipment, each of which is managed by a separate control system hosted on a separate computer. Conventional communications systems of this nature also typically require the use of hyper-technical operator interfaces in order to configure conventional broadband equipment. For these and other reasons, most of such systems are nearly intolerably difficult to utilize, counter-intuitive, cryptic, inefficient and expensive to purchase and operate.

Another problem with conventional broadband communications hardware is their inability to conveniently provide operators with information regarding the system hardware and software. This is, in part, due to the fact that current broadband communications hardware is not sophisticated enough to indicate various attributes of plural data streams. Additionally, user interfaces for conventional broadband communications hardware require skilled personnel to configure routing control for various programs. The difficulties associated with conventional methods of routing control make it extremely difficult to efficiently utilize system bandwidth. Therefore, operators of conventional broadband media routers often underutilize the bandwidth available to perform content stream routing. Given that transport bandwidth is still a precious commodity in this field, this is a significant deficiency.

There is, accordingly, a need in the art for novel methods, systems and apparatus for use in a broadband media router that captures both input bandwidth utilization and output bandwidth utilization data and permits comparative display of these values to occur in real-time. Such methods and apparatus should be sensitive enough to permit operators to perform a visual assessment of the transcoding algorithm efficiency of a broadband media router. Such methods and apparatus should also be able to display bandwidth minima and maxima over a given time period.

There is a further need in the art for novel methods, systems and apparatus that provide operators with real-time bandwidth utilization feedback in order to assist the operators with attempts to maximize bandwidth utilization in a broadband media router. Such methods and apparatus should have the ability to recalculate available bandwidth in real-time and while content stream editing is being performed. This would enable operators to more easily allocate bandwidth among the various content streams so that maximum bandwidth utilization could be achieved. In order to maximize flexibility, such methods and apparatus should also have the ability to break routed content streams down into constituent components for display.

SUMMARY OF THE INVENTION

The present invention satisfies the above-stated needs and overcomes the above-stated and other deficiencies of the related art by providing methods, systems and apparatus that enable real-time visual display of bandwidth utilization of content streams routed through broadband media routers. The present invention can take the form of a graphical user interface capable of displaying real-time bandwidth utilization feedback in order to assist operators attempting to maximize bandwidth utilization through judicious content stream routing. To further enrich functionality of the present invention, the router interface has the ability to capture both input bandwidth utilization and output bandwidth utilization data and it permits comparative display of these values to occur in real-time. The display is sensitive enough to permit operators to perform a visual assessment of the transcoding algorithm efficiency of a broadband media router and also comprehensive enough to display bandwidth minima and maxima over a given time period.

Effectiveness of the invention is optimized by recalculating available bandwidth in real-time and during content stream editing to thereby help operators allocate bandwidth among the various content streams. Additional, conveniences provided by the invention include the ability to automatically rescale x and y axes of the bandwidth utilization display, the resealing occurring in real-time to accommodate changes in data to be displayed. The invention can also display individual components of the routed content streams where each component is represented by a bandwidth bar capable of displaying a plurality of bandwidth attributes such as: output bandwidth utilization, input bandwidth utilization, maximum input bandwidth utilization and minimum input bandwidth utilization.

The invention can also take the form of a method of displaying real-time bandwidth utilization data for plural content streams routed through a broadband media router where the content streams have attributes that vary over time. The method preferably envisions simultaneous display of graphical objects representing input bandwidth utilization, output bandwidth utilization, maximum input bandwidth utilization, and minimum input bandwidth utilization. In a particularly advantageous form of the inventive method, all of these graphical objects are formed as a single bandwidth bar with a height that varies as a function of at least one of the content stream attributes.

With certain embodiments of the invention, the incoming content streams can each comprise plural hierarchical components. In such embodiments, the inventive methods further comprise separately displaying at least one attribute of all of the plural components of one content stream in response to selection of that content stream. While a number of different attributes could be displayed, display of unique alphanumeric character strings obtained from the plural component streams is particularly advantageous.

Naturally, the above-described methods of the invention are particularly well adapted for use with the above-described apparatus of the invention. Similarly, the apparatus of the invention are well suited to perform the inventive methods described above.

Numerous other advantages and features of the present invention will become apparent to those of ordinary skill in the art from the following detailed description of the preferred embodiments, from the claims and from the accompanying drawings.

BRIEF DESCRIPTION OF THE DRAWINGS

The preferred embodiments of the present invention will hereinafter be described in conjunction with the appended drawing figures, wherein like numerals denote like elements, and wherein:

FIG. 1b illustrates a preferred form of the firmware host processor architecture of the transport multiplexer of FIG. 1a;

FIG. 3 illustrates various system hardware attribute viewing capabilities in accordance with one preferred embodiment of the present invention;

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred exemplary embodiment of the invention. It being understood that various changes may be made in the functional arrangement of elements without departing from the spirit and scope of the invention as set forth in the appended claims.

Figure 1A:
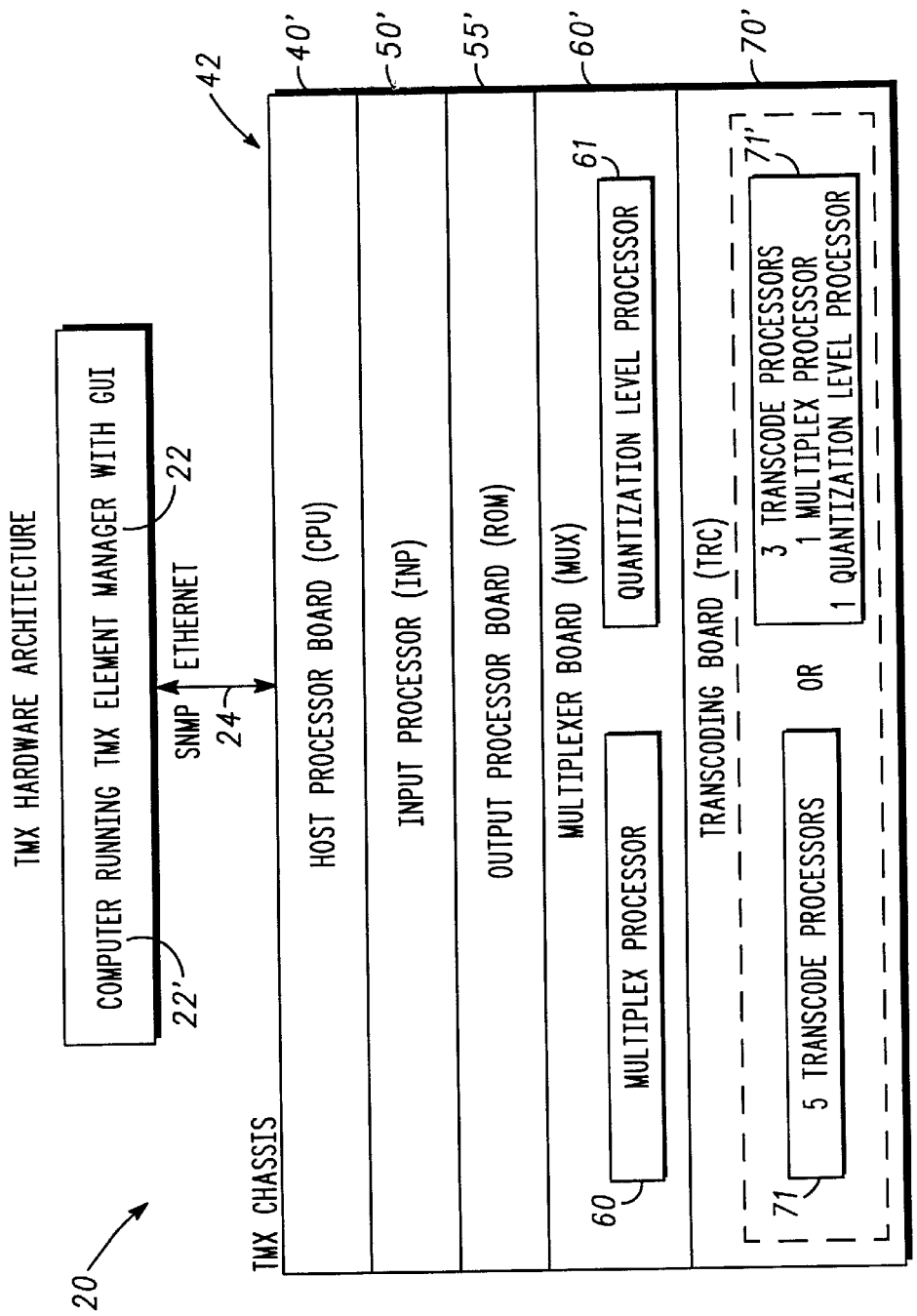
FIG. 1a illustrates the hardware architecture of a transport multiplexer in accordance with one preferred embodiment of the present invention.
Figure 1B:
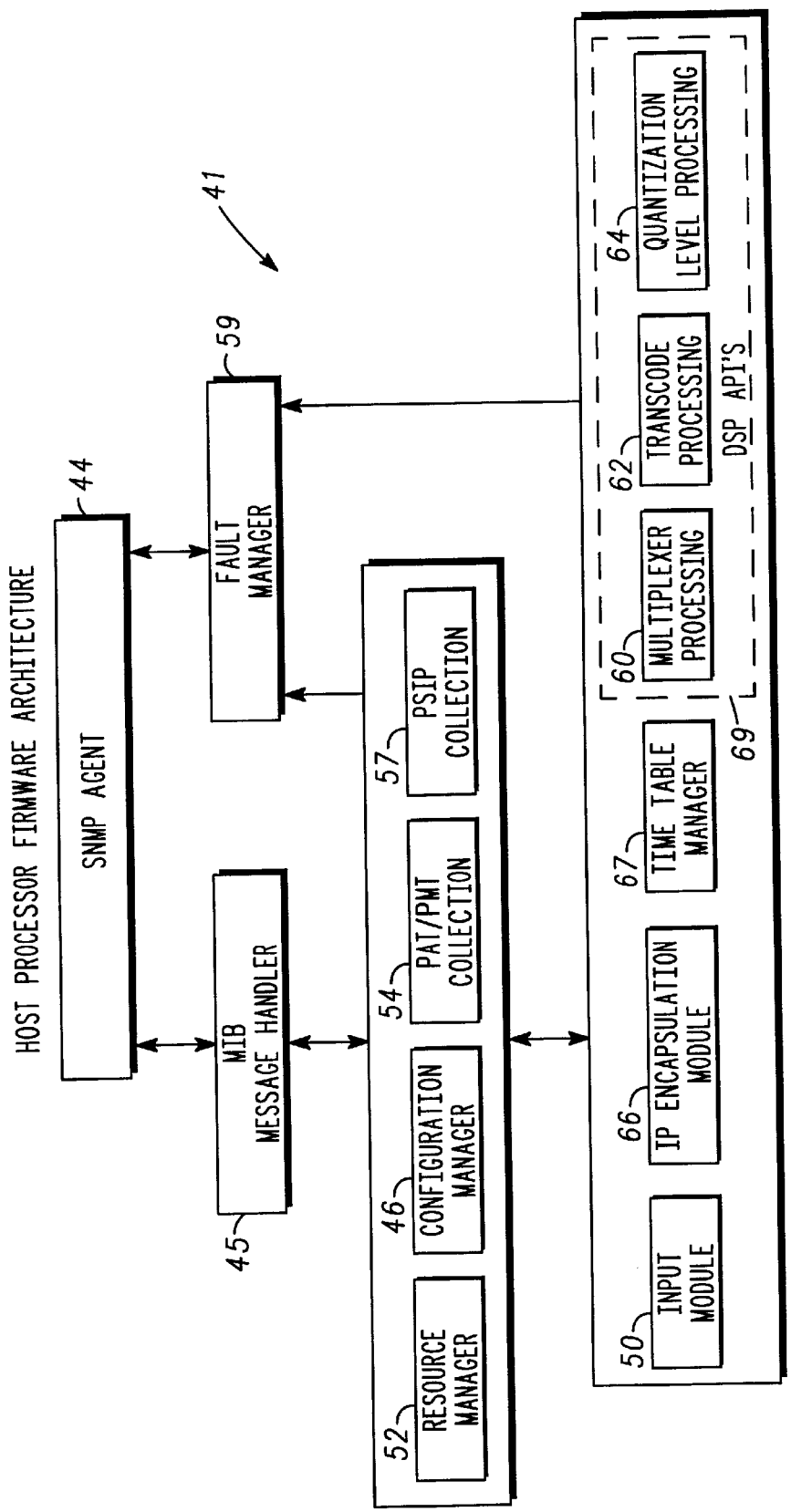

As shown in FIGS. 1a and 1b, TMX 20 includes a plurality of hardware, firmware and software components. FIG. 1a is a hardware architecture diagram showing a representative transport multiplexer (TMX) 20 in accordance with one preferred embodiment of the present invention. As shown therein, the transport multiplexer can include, for example, a computer 22' (with an element manager 22 and a GUI 80) that is communicatively linked to a TMX chassis 42 via a network 24. TMX chassis 42 preferably includes a host processor board 40' (preferably with a VxWorks operating system), an input processor board 50', and output processor board 55', a multiplexer board 60' and a transcoding board 70'. These components are preferably, but not necessarily communicatively linked to one another with a single TMX chassis 42. The basic physical model of the preferred TMX chassis hardware is as follows: the TMX chassis is a container for boards, each board is a container for ports and processors, each processor is a container for firmware, and each port is a container for a protocol hierarchy (i.e., DS3, MPEG, TCP/IP, etc.). The chassis and each board have a set of state and status variables associated with them. These include: 1) an administrative state which is used to synchronize configuration access of multiple managers; 2) an operational state which is used to indicate whether or not the TMX (or a component of it) is in a fully enabled and operational state; and 3) an alarm status which is used to signal a variety of alarm conditions by the TMX or a component thereof. As described in detail below, the host processor 40 controls the various hardware and software components of TMX 20 and stores MIB table data in accordance with SNMP for use by the various other components of the TMX and the element manager.

Transport multiplexer 20 is suited to a wide variety of application environments including: (1) cable headend; (2)

satellite uplink; and (3) terrestrial broadcast. Communication between element manager 22 and TMX chassis 42 is preferably performed in accordance with a modified Simple Network Management Protocol (SNMP) and the content streams to be routed through transport multiplexer 20 are preferably in accordance with one of the well-known MPEG standards. Most preferably, the content streams are MPEG2 data streams. While some preferred embodiments of the present invention use some conventional MIB tables in accordance with well known SNMP standards, many of the MIB's referenced herein comprise novel data structures. These data structures are fully defined in the computer program appendix incorporated by reference. Therefore, those of ordinary skill will more than amply understand the nature and function of those novel data structures based on the teachings contained herein.

A more detailed description of the hardware components of TMX 20 is provided in previously mentioned co-pending U.S. patent application Ser. No. 10/124,610, filed Apr. 16, 2002 and entitled "High Speed Serial Data Transport Between Communications Hardware Modules," which Application has been incorporated herein by reference. Accordingly, further detailed discussion of these hardware components is not necessary, a complete understanding of these components being achieved with reference to these incorporated applications.

Figure 2:
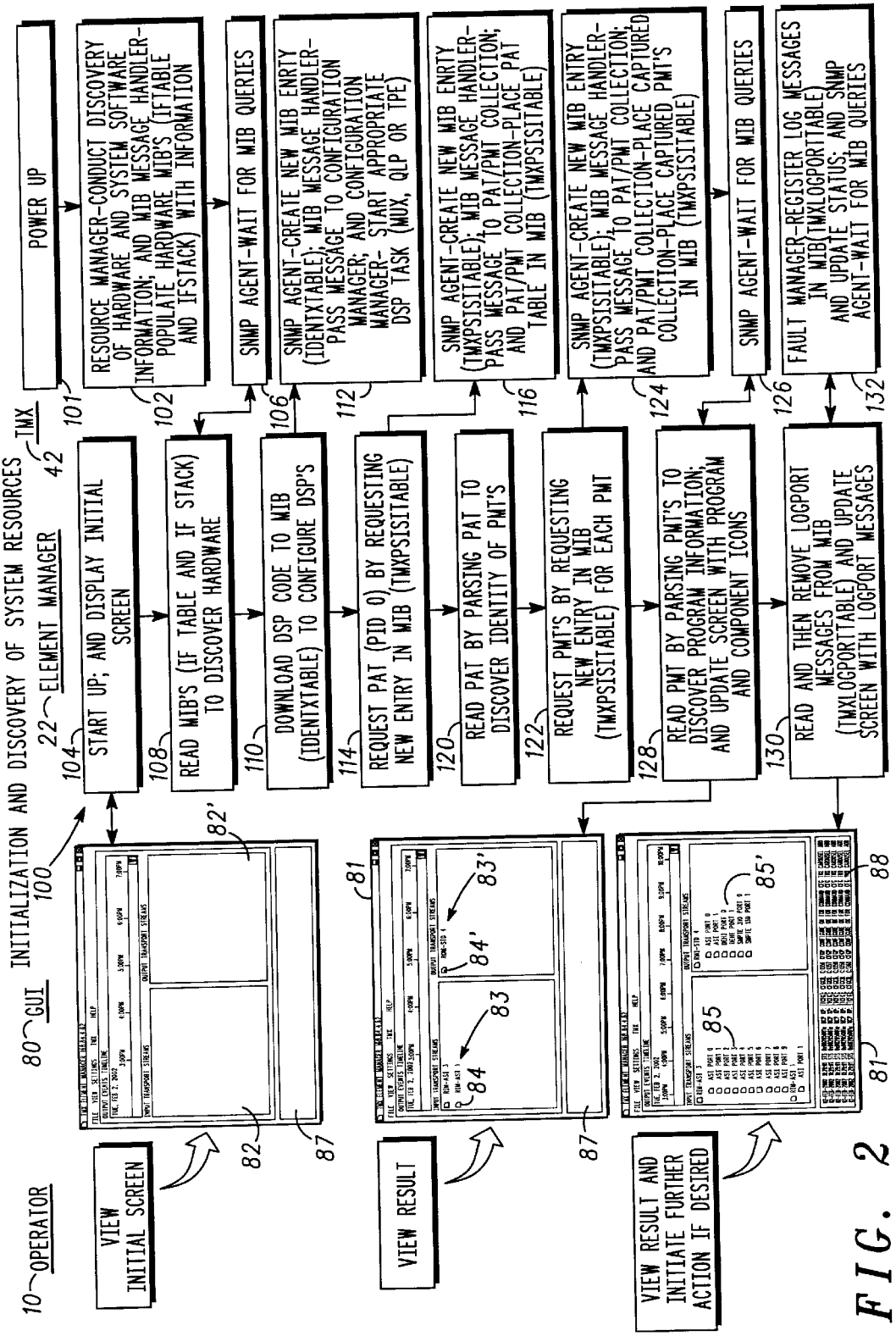
FIG. 2 illustrates system initialization and resource discovery processes for the transport multiplexer of FIG. 1, the processes being in accordance with one preferred embodiment of the present invention.

The relationship between physical and logical resources in the system needs to be manipulated and communicated between TMX chassis 42, element manager 22 and human operators 10 (e.g., FIG. 2). This is generally achieved by modeling the various hardware components of the system. The TMX modeling elements are integrated into the SNMP Management Information Base (MIBs) by using the standard "MIB 2" interfaces table (ifTable) to represent each one of the modeling elements as an interface with specific extensions as specified below. This permits identification of any board and/or any port, by its table index: the ifindex in the ifTable.

With continuing reference to FIG. 1a, element manager 22 is preferably linked to TMX chassis 42 by an Ethernet. It will be appreciated by those skilled in the art that other network technologies can alternatively be used. Element manager 22 may be uploaded as a java-application from TMX 42 to a remote computer using a browser, the remote computer preferably being communicatively linked to transport multiplexer 20 via network 24 during an initial set-up phase. Subsequently, element manager 22 can be run on the remote computer as a java program. The remote computer is preferably a conventional personal computer with a conventional operating system and browser, the system permitting control over TMX chassis 42 subsequent to installation of element manager 22. A graphical user interface (GUI) is preferably incorporated into element manager 22 and is described in detail below. The GUI is preferably presented to an operator on a conventional personal computer monitor (e.g., an LCD screen or a CRT monitor). A wide variety of alternative software and hardware components for hosting and operating graphical user interface and element manager 22 will readily occur to those of ordinary skill in the art based on the disclosure contained herein FIG. 1b illustrates various firmware and software components 52–69 of TMX 20 which are communicatively linked to one another as shown therein. These components include an SNMP agent 44, a message handler 45 and a fault manager 59. TMX 20 further comprises a resource manager 52, a configuration manager 46, a PAT/PMT collection module 54, a PSIP collection module 57, an input module 50, an IP encapsulation module 66, a time table manager 67 and a number of DSP API's. These include multiplexer processing 60, transcode processing 62 and quantization level processing 64. There is a one-to-one correspondence between these firmware modules and certain hardware components of the preferred embodiment. The corresponding hardware components can be found in FIG. 1a and include input processor board 50', multiplexer board 60' (with a multiplex processor 60 and a quantization level processor 61), a transcoding board 70' (with either 5 transcode processors 71 or 3 transcode processors, 1 multiplex processor and 1 QLP 71'). Consequently, when the configuration manager performs operations on the firmware modules, the corresponding hardware modules are also affected. The flow of information and commands between the various components within TMX chassis 42 is generally indicated in FIGS. 1a and 1b by the use of arrows. In particular, the flow of commands and information from element manager 22 is through SNMP agent 44, which translates SNMP protocol commands from element manager 22 into a conventional form so that they can be understood by the various other components of TMX 20. The preferred conventional communication protocol is a simple protocol in which a number indicative of a request or command is passed along with an associated data structure for receiving data to be manipulated in accordance with the associated command. Thus, SNMP agent 44 generally acts as a communication broker between element manager 22 and the host processor firmware. SNMP agent 44 allows SNMP based management of and control over firmware functionality such as grooming, splicing, data insertion, etc., because it provides an interface with the various firmware modules (e.g., input processing task 50, multiplexer processing 60, transcode processing 62 and quantization level processing 64) that ultimately provide the desired functionality.

Configuration manager 46 receives commands and information from SNMP agent 44 via MIB message handler 45 and determines how to utilize the hardware and other firmware to execute those commands at the card level. A detailed understanding of the various other components of TMX 20 will be obtained with reference to FIGS. 2 through 9 and the corresponding detailed description of these figures in the remainder of this specification.

FIGS. 2 through 11 illustrate the nine primary operational aspects of transport multiplexer 20. These nine operational aspects include (1) initialization and discovery of system resources 100; (2) view system hardware attributes 134; (3) view system software attributes 156; (4) enable output port 166; (5) specify present video and/or audio routing event(s) 184; (6) view bandwidth utilization 206; (7) view log activity 222; (8) specify future routing event(s) 238; and (9) IP data encapsulation and insertion 260. These aspects of the present invention are discussed in detail immediately below.

With reference to FIG. 2, there is illustrated therein system initialization and resource discovery processes for the broadband multiplexer of FIG. 1, the processes being in accordance with one preferred embodiment of the present invention. As shown, initialization and discovery of the inventive system commences with power-up 101 of TMX chassis 42, whereupon resource manager 52 conducts discovery (at 102) of the hardware and system software information. Thus, TMX chassis 42 executes a number of functions at 104 to identify system components installed in TMX chassis 42. Also at 102, MIB message handler 45 populates the appropriate MIB's (ifTable and ifStack) with information and SNMP agent 44 awaits queries at 106. Upon completion of these tasks, TMX chassis 42 is prepared to execute various activities based on operator-driven commands delivered to TMX chassis 42 via element manager 22.

At this point, an operator 10 can start up element manager 22 in response to which the element manager, at 104, displays graphical user interface 80 showing a blank tree view screen 81 for viewing. Blank tree view screen 81 includes an input tree window 82, an output tree window 82' and a log message window 87. At 108, element manager 22 automatically reads the appropriate MIB's to discover the hardware that is currently installed in TMX 20. This includes system hardware attribute data such as port data and/or physical structure. There are several types of ports (e.g., ASI, DHEI, SMPTE 310, DS3) which are supported by the preferred embodiment of the present invention. Data for various port parameters is described/defined by the ifentry MIB table. At 110, element manager 22 downloads the appropriate DSP code to the IdentxTable MIB. SNMP agent 44 of TMX chassis 42 creates a new MIB entry at 112 and message handler 45 passes this information to configuration manager 46 for fulfillment. At this point, element manager 22 requests PAT data at 114. This request is processed by the TMX at 116. At 120, the PAT is parsed by element manager 22 so that the appropriate PMT's can be identified. These are requested at 122 and this request is processed by the TMX at 124. After the requested information is generated, SNMP agent 44, awaits further queries at 126. This data is then read by element manager 22 at 128 and graphical user interface 80 is updated. In particular, the requested data is used to populate tree view screen 81 with system hardware icons 84 and 84' and, preferably mnemonic, hardware names 83 and 83' extracted from the data streams themselves using PSIP collection module 57. Operator 10 is, thus, presented with a visual representation of the system hardware components.

After receiving the system hardware attributes data from TMX chassis 42, element manager 22 proceeds to retrieve and display log messages that may have been generated at 130. This is achieved with the assistance of a fault manager 59 and SNMP agent 44 at 132. Thus, once log polling has commenced, element manager 22 displays the port and log data at 132 to graphical user interface 80 where the tree view screen is updated to display input ports 85, output ports 85' and log messages 88 in log message window 87. As shown, input and output ports 85 and 85' preferably have associated mnemonic and alphanumeric identifiers. The ports are also preferably color coded to indicate whether or not the ports are active. Upon reviewing the newly completed tree view screen 81, operator 10 can initiate various activities as described below with respect to FIGS. 3 through 10. These activities can include, for example, view system hardware attributes 134, view system software attributes 156, enable output port 166, specify present video and/or audio routing events 184, view bandwidth utilization 206, view log activity 222, specify future routing events 238 and IP data encapsulation and insertion event(s) 260. Various other related activities that can be performed by operator 10 will readily occur to those of ordinary skill in the art based on the disclosure contained herein.

Figure 3:
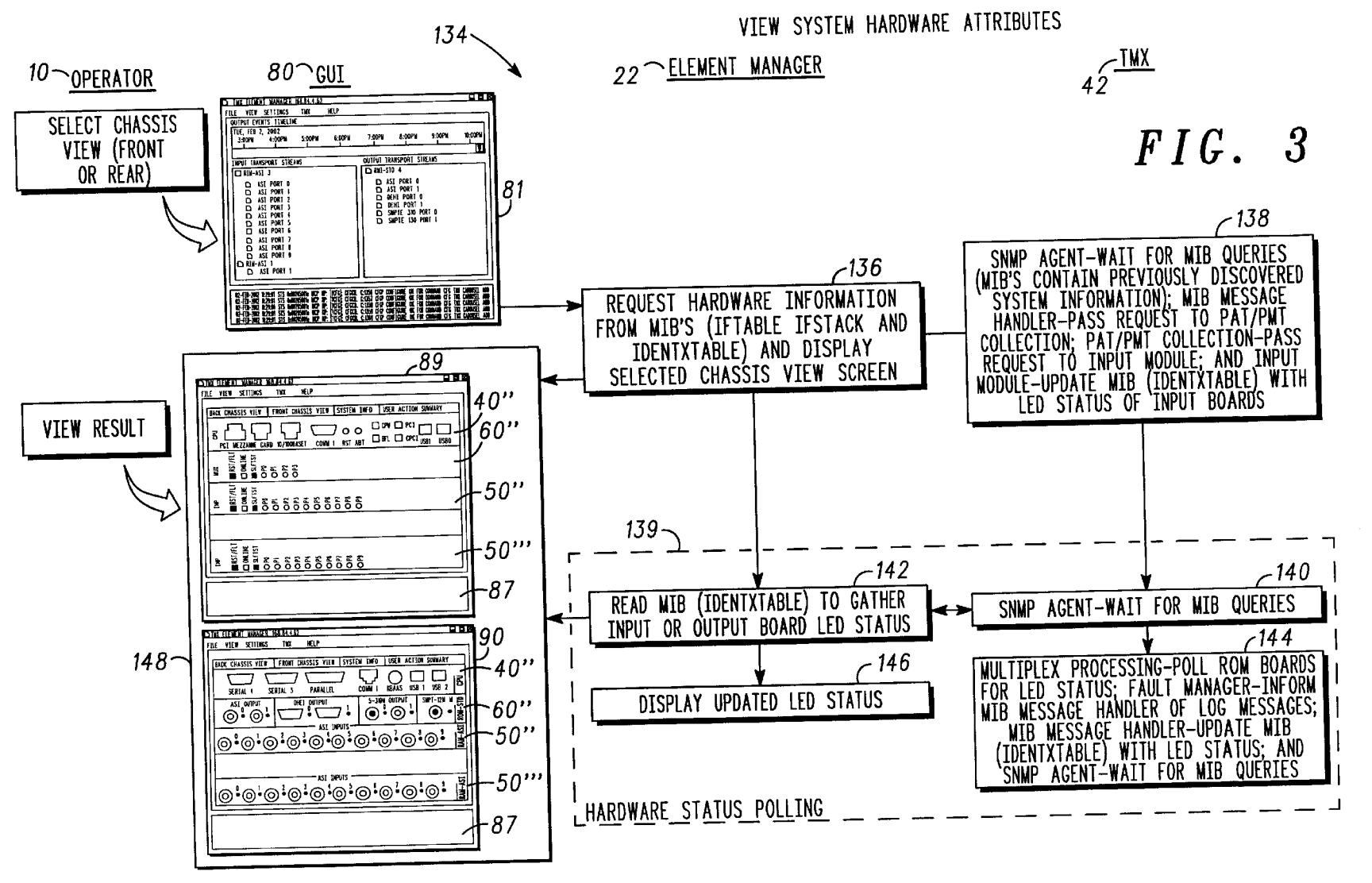

Turning now to FIG. 3, this Figure illustrates various system hardware attribute viewing processes 134 in accordance with one preferred embodiment of the present invention. The hardware processes shown in FIG. 3 are initiated by operator 10 upon selection of the chassis view screen from the menu items at the top of tree view screen 81. This option is accessed by selecting the "view" menu item at the top of the screen and selecting the chassis view option. Available hardware viewing options include "front chassis view" and "rear chassis view" and "system information." Upon selection of one of the chassis view options at the graphical user interface, element manager 22 gathers the requested hardware information from the appropriate MIB's (136) with the assistance of TMX chassis 42. This MIB data is provided by TMX chassis 42 as indicated by 138 and element manager 22 then displays the information on one of chassis view screen 89 and 90.

With continuing reference to FIG. 3, one can see that graphical user interface 80 uses the received hardware and status data to display system hardware attributes and, in particular, chassis view screens 89 and 90 as initially requested by operator 10. Front chassis view screen 89 includes various graphical objects indicative of the identity of, physical structure of, configuration of and status of the various cards received within TMX chassis 42. In this illustrative example, these cards include CPU card 40", multiplexer card 60', first input processor board 50" and second input processor board 50"'. While it is also possible to receive log messages within log message window 87 of front chassis view screen 89, no log messages have been generated in this illustrative example.

Rear chassis view screen 90 can also be selected by operator 10 as an alternative to front chassis view screen 89. In this illustrative example, rear chassis view screen 90 includes various graphical objects indicative of the identity of, physical structure of, configuration of and status of the rear portion of the various cards received within TMX chassis 42 and discussed above with respect to the front chassis view. The log messages can, optionally, also be displayed in log message window 87 of rear chassis view screen 90. This aspect of the present invention allows an operator 10 to easily select, and then, view system hardware attributes in the manner discussed above. This feature of the present invention is particularly advantageous in that it allows an operator to troubleshoot difficulties with transport multiplexer 20 without having to physically access the communications hardware itself.

The preferred continuous hardware status polling features of the present invention are shown at 139. In particular, the LED status information provided in the chassis view screens is updated at regular intervals by the repeated execution of the functions shown in blocks 140–146.

Figure 4:
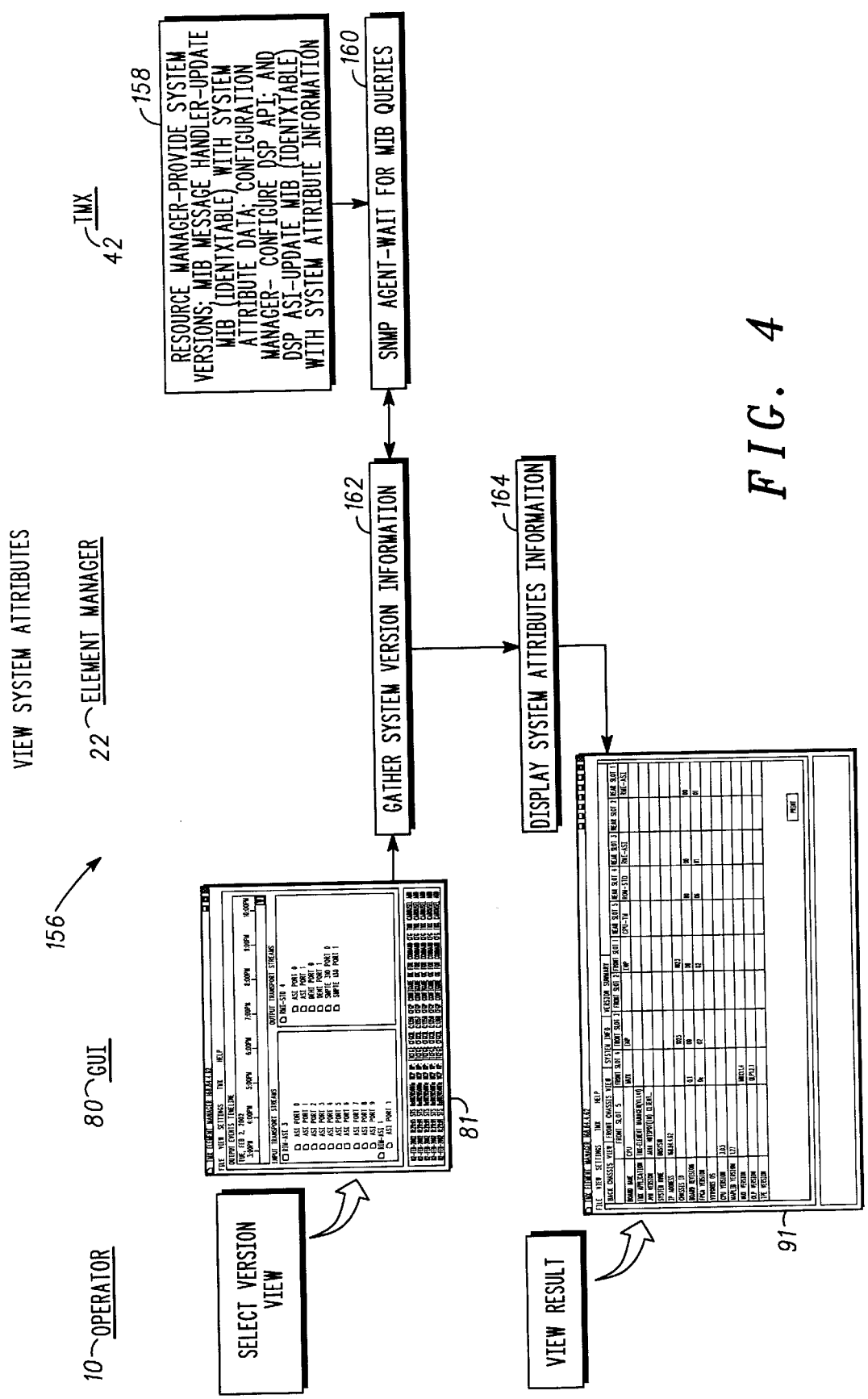
FIG. 4 illustrates system attribute viewing capabilities in accordance with one preferred embodiment of the present invention.

Turing now to FIG. 4, this figure illustrates system attribute viewing processes and capabilities 156 in accordance with one preferred embodiment of the present invention. As shown therein, viewing of system attributes such as board type, DSP attributes, software version, etc. commences with the initial system discovery process when the TMX executes the functions shown at 158. Thus, this information is readily available for display and SNMP agent 160 waits for such queries at 160. Upon selection of the version view menu option within the top portion of tree view screen 81 by operator 10, element manager 22 gathers the requested information at 162 displays it in system attributes screen 91. The data can then be viewed by operator 10 as desired. As shown in FIG. 4 and Table 1 below, system attributes data displayed on screen 91 preferably includes the following data fields for the board and software running on each chassis slot:

TABLE 1

Board Name
TMX Application
JVM Version
System Name
IP Address
Chassis ID
Board Revision
FPGA Version
VxWorks 08
CPU Version
MAP Lib Version
MUX Version
QLP Version
TPE Version In the illustrative embodiment of FIG. 4, TMX chassis 42 is a mid-plane TMX chassis with five board slots in each half of the chassis. Accordingly, this illustrative example includes ten slots (five slots for each half-plane). A detailed description of the structure and operation of TMX chassis 42 is contained in the application incorporated by reference and a wide variety of variant arrangements will readily occur to those of skill in the art based on the disclosure contained herein.

Figure 5:
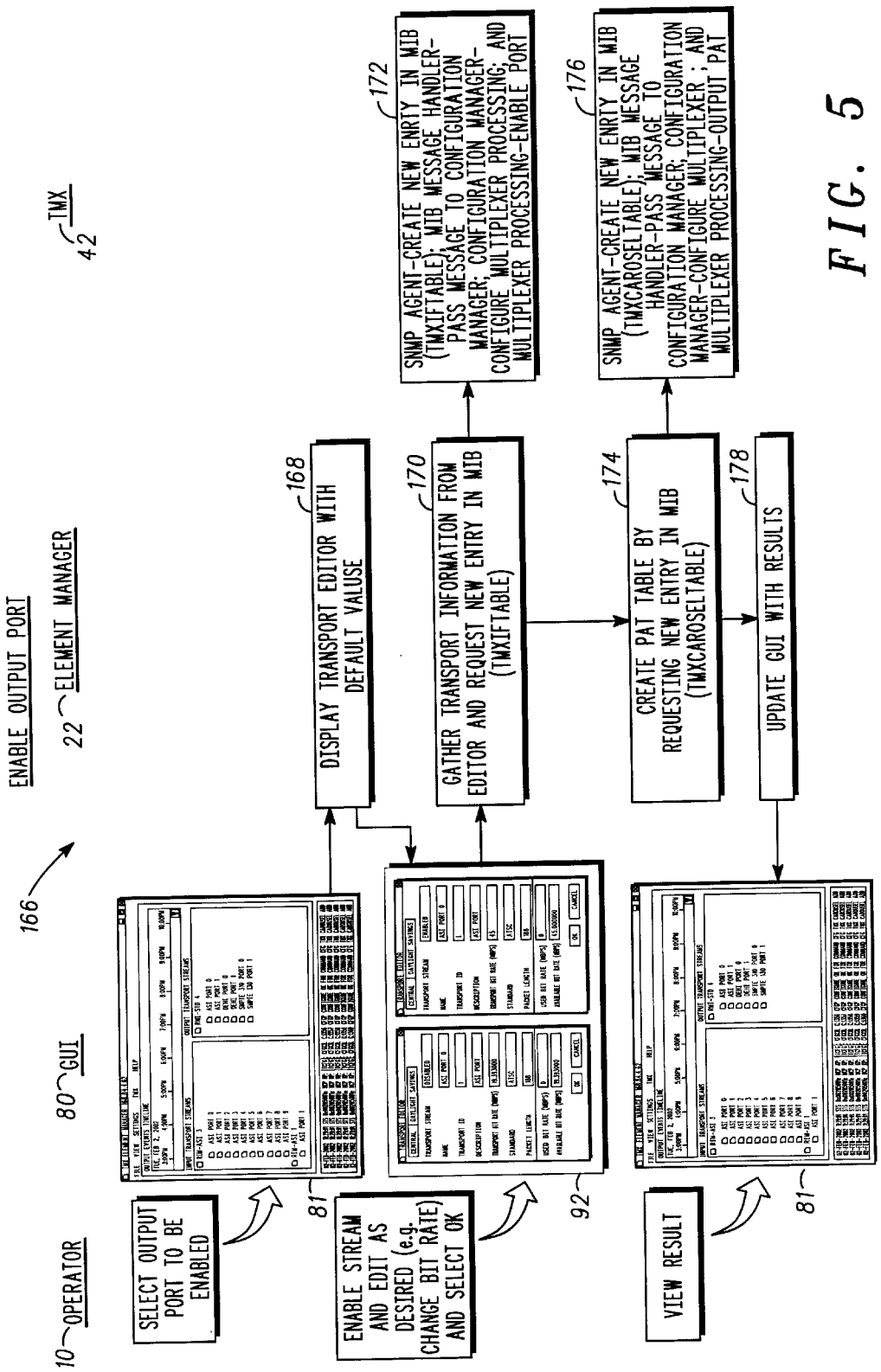
FIG. 5 illustrates various output port enabling processes in accordance with one preferred embodiment of the present invention.

As shown in FIGS. 3 and 4, the preferred embodiment of the present system includes a GUI with a system information tab with which an operator can access information about the system such as system name, system description, system up-time and system location. This feature of present invention operates in a manner that is generally analogous to the view software version feature shown in FIG. 4 and described in connection therewith immediately above FIG. 5 illustrates various output port enabling capabilities in accordance with one preferred embodiment of the present invention. As shown therein, output port enabling is initiated upon selection by operator 10 of the particular port to be enabled. Upon selection of a port, element manager 22, at 168, displays the transport editor 92 with default values. Operator 10 can then view the default data and edit the data if desired, such as by changing the status from disabled to enabled. For example, an operator will typically enable a transport stream, name that stream and assign an information transfer bit rate for the selected port. Upon selection of the "OK" button, the transport editor is closed, and element manager 22 gathers transport information from the editor and places it in the appropriate MIB tables (see 170). The TMX chassis also uses this information to execute the enable request as indicated at 172. The MIB table could be either one of two types: TMXiftable (for most ports) or the TMXgiexttable (for DS3 ports) due to the varying information requirements of the different port types.

Further, element manager 22 creates a PAT at 174 and the PAT is output by the TMX as indicated at 176. Finally, the tree view screen 81 of the GUI is updated by the element manager as indicated at 178. Graphical user interface 80 indicates successful enablement of the desired port by changing the attributes of the port icons in tree view screen 81. This is preferably accomplished by changing the color of the port icons, but other alternatives (such as changes in shape, movement, location, size, sound, etc.) will readily occur to those of ordinary skill in the art. Operator 10 can, thus, visually confirm that port enablement was successfully completed by viewing the newly-updated graphical user interface 80.

Figure 6:
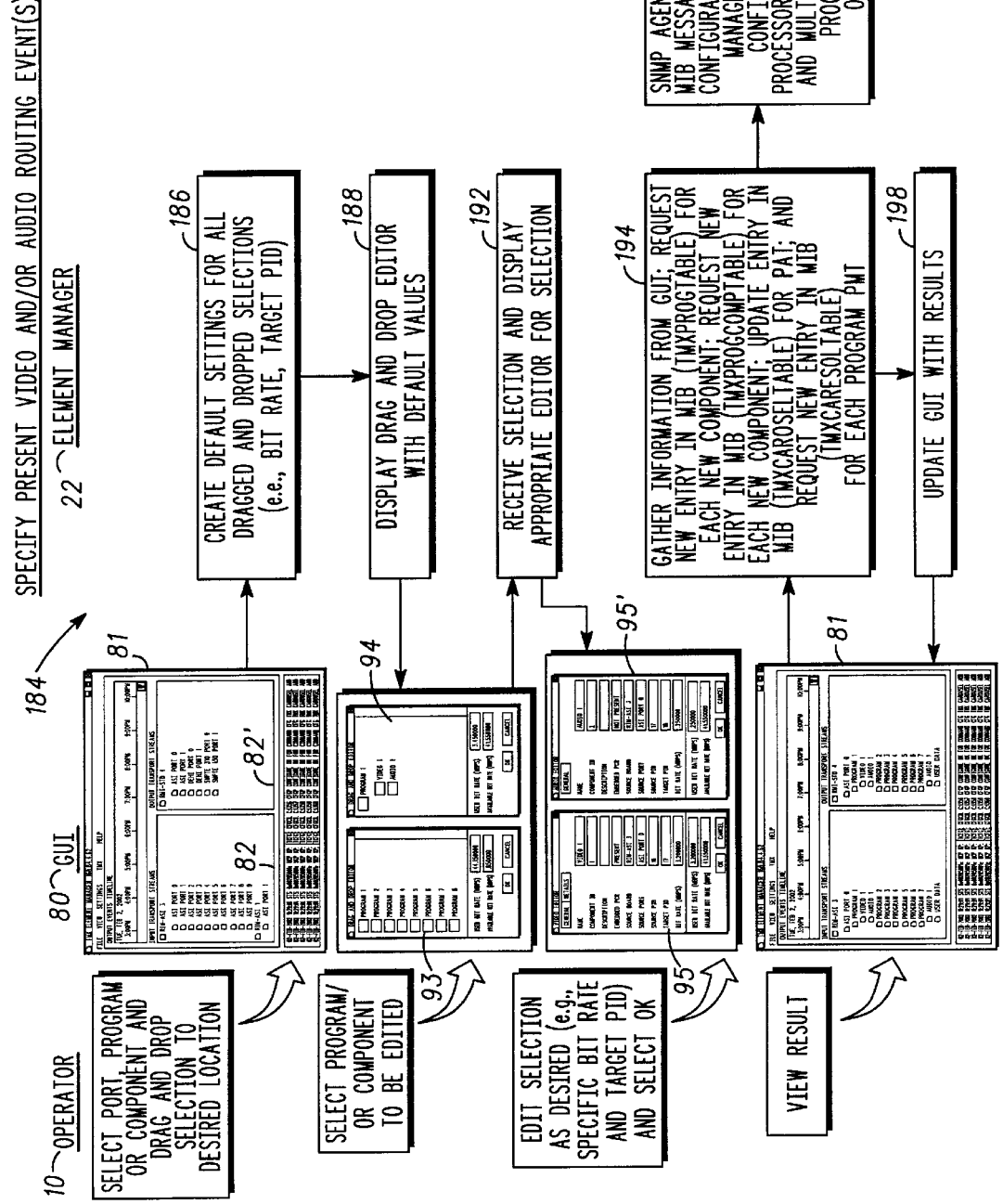
FIG. 6 illustrates specification of present video and/or audio stream routing event(s) in accordance with one preferred embodiment of the present invention.

FIG. 6 illustrates various system-assisted video and/or audio routing capabilities in accordance with one preferred embodiment of the present invention. As described in greater detail below, the present invention enables operator 10 to define and execute content stream routing either manually or semi-automatically. In particular, the preferred embodiment of the present invention provides operators with the ability to manually enter routing data element by element or, alternatively, to drag and drop graphical objects to and from various locations of the tree view screen 81. Element manager 22 cooperates with graphical user interface 80 to execute the various routing specification commands specified by corresponding drag and drop operations. This is achieved with automated population of MIB tables corresponding to the various actual fields necessary to define a routing command. Drag and drop operations on graphical user interface 80 assist operator 10 in defining video, audio and/or IP data routing events for the system. Defining routing specifications in this way is, therefore, semi-automatic.

Drag and drop operations on the graphical user interface can be used to perform a variety of related content stream routing functions. These include the ability to drag different levels from the input tree to the output tree. For example, an operator may drag (1) the content streams of an entire input port (possibly including plural programs, each of which possibly includes plural components) to an output port; (2) a complete program of an input port to an output port; (3) a complete program from an input port to a program of an output port; and (4) a component from an input port to an output port. A number of other drag and drop features will readily occur to those of ordinary skill in the art based on the disclosure contained herein. However, it should be noted that this portion of the specification specifically addresses content stream routing that occurs in the present. The invention, however, also envisions configuration of content stream routing to be automatically executed at a future time (see, e.g., FIG. 9). As described in greater detail below, content stream routing processes described immediately below (applicable to execution of present routing commands) are compatible with, and form a portion of, routing processes for execution of routing events in the future.

With primary reference to FIG. 6, operator 10 can specify one or more present routing events by selecting the graphical objects representing one or more content streams to be routed to a desired location (e.g., an output port). The content stream could be either simple or contain plural components which may or may not be related to one another in one or more ways. For example, the object may represent a single component content stream, plural content steams that collectively constitute a program, or plural content steams that collectively constitute data streams present on an entire input port. In the illustrative example discussed immediately below, operator 10 drags the content streams for an entire port from the input tree to the output tree and proceeds to edit video and audio components of one program from the port.

Assisted routing in accordance with the invention is preferably accomplished with a drag and drop operation of one or more graphical objects from the input port window 82 to the output port window 82' of tree view screen 81. This operation has the effect of capturing, as indicated at 186, configuration data corresponding to the selected source of the data stream(s). For example, dragging and dropping the desired graphical objects enables element manager 22 to automatically capture corresponding configuration data for the desired routing events such as input port number and location, output port number and location, content stream PID to be routed and bit rate for the content streams to be routed. Additionally, information regarding the targeted output port (determined based on where the object is dropped) is also captured (188) by element manager 22 and includes, for example, the location of the targeted output port. This information enables element manager 22 to create default settings and to automatically perform PID aliasing at 186 so that there are no data stream conflicts as the various streams are routed through transport multiplexer 20. The drag & drop editors 93 and 94 are then displayed by element manager 22 as indicated at 188. The operator can then select the particular component to be edited and, at 192, element manager 22 receives the selection and displays a component editor (95 for video streams or 95' for audio streams) with default information for possible editing. If the default data shown in the component editor 95 is acceptable to the operator, the "OK" button can be selected to cue the element manager to take further action. In particular, closing of the component editor window causes element manager 22 to gather the information from the GUI and to request the creation of various MIB table entries as shown at 194. The TMX executes the routing events in accordance with the updated MIB's at 196 and the GUI is appropriately updated by the element manager 22 as indicated at 198. From the operator's perspective, routing has been specified and performed simply by dragging and dropping an icon from the input tree to an output tree. In actuality, a variety of routing parameters have been specified with the assistance of the system as described in detail above.

If operator 10 wishes to modify the default and/or captured data, operator 10 has the ability to edit the information in detail for each of the components that comprise the content stream. In the example shown, operator 10 has selected program 1 (in general, an operator would select some type of graphical object, such as an icon or its associated text) shown in editor window 93 and a more detailed editor window 94 is displayed, the window showing the constituent components of the selected program. In the case of FIG. 6, program 1 has been selected for editing and it includes one video component and one audio component.

Graphical user interface 80 preferably has the capability of identifying content streams using a variety of graphical objects which include icons, alphanumeric character strings, actual program names, etc. on the various screens. The content stream identification data is preferably carried within the media stream so that it can be consistently displayed throughout the graphical user interface regardless of which viewing screen is presented to operator 10. Restated, graphical user interface 80 preferably presents a consistent content stream name or symbol and can display it throughout the interface.

With continuing reference to FIG. 6, selection of the "OK" button of window 94 closes the drag and drop window and opens the component editor windows corresponding to the selected components as indicated at 192. In this case, selection of a component to be edited further results in display of one of component editor windows 95 and 95' where operator 10 has the further ability to specify details such as bit rate, target PID, etc. for any of the components of the desired program. In this case, video editor window 95 and audio editor 95' are displayed for consideration and possible editing. This feature enables a user to more easily allocate bandwidth among the various content streams being routed so that maximum bandwidth utilization can be achieved.

Upon selection of the "OK" button of one of windows 95 or 95', the element manager 22 changes the MIB table data in accordance with the edited changes and instructs the TMX to execute the specified routing configuration. Configuration manager 46 then sequentially configures the targeted multiplexer and quantization level processor and enables the input processor, in that order, as indicated at 196.

The module activation order, when an output port is enabled, is an important aspect of the present invention. In order to effectively execute a routing event, the targeted multiplexer, quantization level processor and input processor should be activated in the order specified to minimize the possibility of the destabilizing the system.

In particular, configuration manager 46 directs the targeted multiplexer to collect the designated PIDs and route them to the targeted output. Second, the configuration manager 46 must provide the quantization level processor 64 with the appropriate bit rate and PMT for the content stream to be routed. Third, configuration manager 46 should instruct the input processor to send all of the content streams with a particular PID to the multiplexer. This is preferably accomplished by performing PID aliasing and then sending the associated data to the multiplexer as a low voltage differential signal.

As noted above, module activation in an order other than that discussed above may lead to system instability. If, for example, the configuration manager attempted to enable the input processor first, the multiplexer may begin to receive a content stream that it does not expect and this confusion may cause the multiplexer to crash. Similarly, removing a content stream (ceasing to route the stream to the port) should be performed in a predetermined order dictated by configuration manager 46. In particular, the sequence noted above should be reversed (deactivation of the input processor, deactivation of the QLP and, finally, deactivation of the multiplexer). If, for example, the multiplexer were disabled first, the multiplexer may still receive a content stream from the input processor and, once again, this condition may crash the multiplexer.

Figure 7:
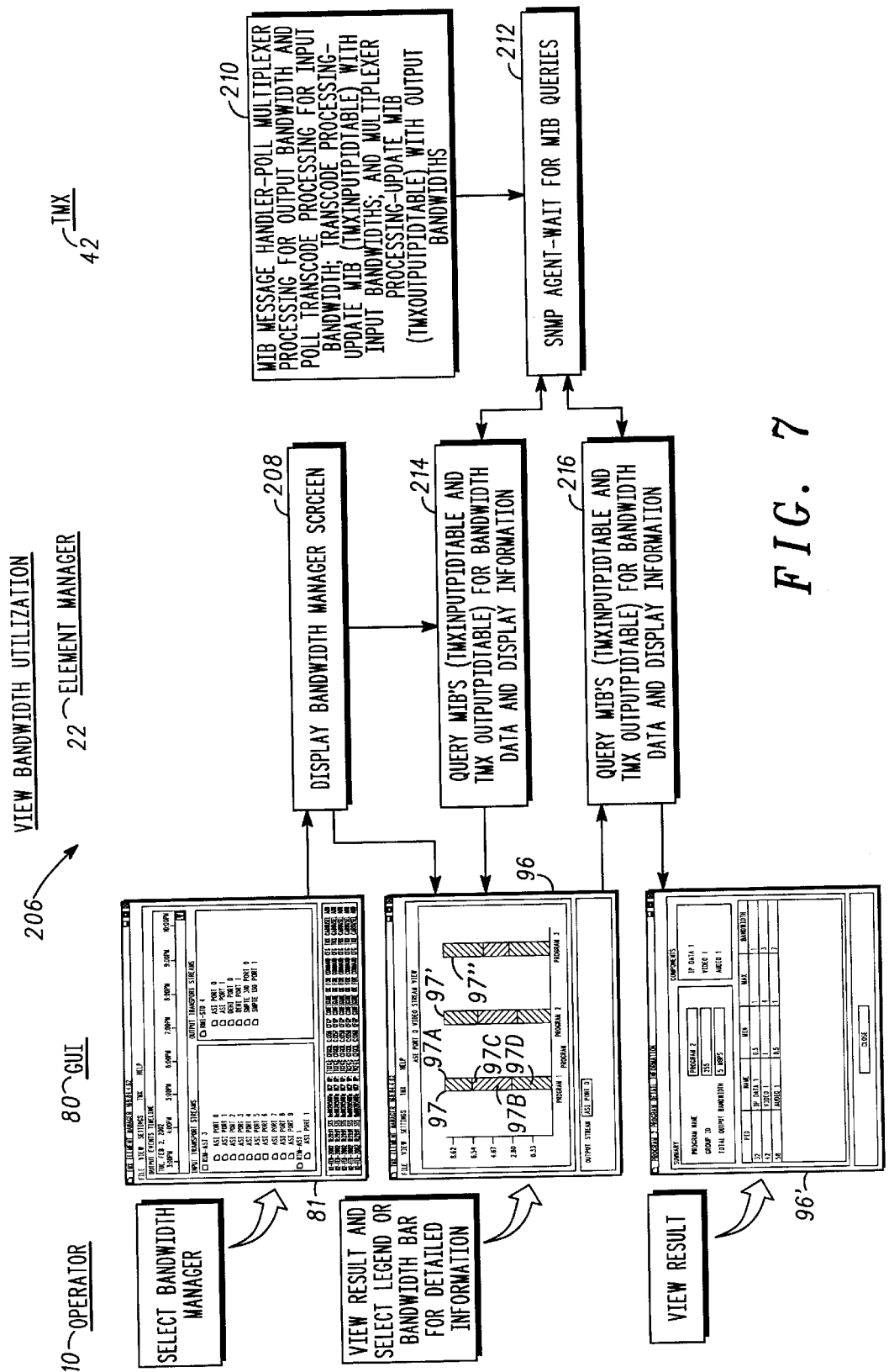
FIG. 7 illustrates various system bandwidth utilization viewing capabilities in accordance with one preferred embodiment of the present invention.

Turning now to FIG. 7, this figure illustrates various system bandwidth utilization viewing capabilities in accordance with one preferred embodiment of the present invention. As shown therein, operator 10 initiates the view bandwidth utilization feature of the invention by selecting the bandwidth manager menu item from the upper portion of tree view screen 81. This enables element manager 22 to display the bandwidth manager screen at 208 and the TMX begins polling the system for bandwidth utilization data and waiting for queries for this data as shown at 210–212. As indicated more fully in the accompanying computer program appendix, the MIB tables enable monitoring of MPEG input/output bandwidth utilization information. In particular, the TMXinputPIDtable is used for input rate monitoring per PID. The TMXoutputPIDtable is used for output rate monitoring per PID.

In particular, message handler 45 begins polling input processor and output multiplexers for data that is used to update the MIB tables (capturing data from these two sources allows the bandwidth display to show a comparison between the input bandwidth and output bandwidth) and sends the data as SNMP data to element manager 22, as indicated at 214. Element manager 22 periodically queries the TMX for this information and at 216 displays this data on graphical user interface 80. It then returns to continue polling for new bandwidth utilization data at 214. In this way, bandwidth utilization data for all enabled ports is continually updated and can be displayed by graphical user interface 80 in real-time. Bandwidth data polling preferably ceases when operator 10 closes the bandwidth windows 96 and 96' such as by switching to the chassis or tree view screens. At that point, the PID's for the enabled content streams are deleted from the MIB tables.

Upon receipt of bandwidth utilization data, graphical user interface 80 displays a bandwidth utilization screen 96. This screen preferably includes automatically resealing x and y axes and an individual graphical object for each content stream being routed, each object preferably being a bandwidth bar (bars 97, 97' and 97" in the example shown). Each bandwidth bar shown in screen 96 preferably includes the following plural attributes: an output bandwidth utilization value 97a, an input bandwidth utilization value 97b, a maximum input bandwidth utilization value 97c and minimum input bandwidth utilization value 97d. In practice, changes in the bandwidth utilization are automatically displayed in bandwidth utilization screen 96 in real-time.

Bandwidth utilization screen 96 can include a number of user-friendly features to make the graphical user interface even more intuitive and useful. For example, operator 10 may be provided with the ability to select or deselect a legend display shown on the right hand portion of bandwidth utilization screen 96. Similarly, operator 10 preferably has the ability to select or deselect display of the minimum and maximum bandwidth utilization values. Furthermore, screen 96 preferably has the ability to display the same mnemonic identifiers for the various streams that are used in other screens such as the tree view screen. Restated, the graphical user interface preferably reflects a consistent identifier for each content stream throughout the system. Naturally, other identifiers could be used if desired. These identifiers are preferably sent with the content streams so that they can be detected and displayed in various screens. As noted above, the identifiers may be displayed as colored icons and/or alphanumeric character strings, etc.

After viewing bandwidth utilization screen 96, operator 10 may select one of the bandwidth bars to dynamically display more detailed information about the various components that make up the content stream for the selected bar. For example, a given program might include one video and two audio components. Selecting a bandwidth bar will cause detailed bandwidth utilization window 96' (with additional information about these components) to appear on the screen. This type of selection causes element manager 22 to generate a query at 216 which is responded to by the TMX at 210/212. As shown in window 96', the program name, the group ID and the total bandwidth at the instant that the bandwidth bar was taken are captured and displayed on the screen. In this illustrative embodiment, the bandwidth bar for program 2 was selected when the bandwidth utilization was about five megabits per second (compare windows 96 and 96' of FIG. 7). Additionally, the detailed window breaks the selected program down into its constituent components. In this case the program has three constituent parts: IP data 1, video data 1 and audio data 1.

The screen 96' shows even more detailed information for each component of the program. This information preferably includes a bandwidth minima value, a bandwidth maxima value and the instantaneous bandwidth utilization of the constituent components at the instant the detailed bandwidth utilization window was selected. With joint reference to screens 96 and 96', it will be appreciated that the displayed bandwidth utilization of the constituent components sums to the bandwidth utilization of the entire program. Additionally, the sum of the minimum values of the constituent components equals the minimum value for the program as a whole. Similarly, the maximum value for the entire program equals the sum of the minimum values for each of the constituent components. Finally, the display shows the packet identifier PID associated with the program.

Since this aspect of the system displays bandwidth in real-time, the operator will see the bandwidth utilization varying over time. Also, differences in bandwidth utilization at different points in time will reflect the fact that input signals can vary over time on the input side of the whole system. For example, if an input signal suddenly includes an additional component, the bandwidth display screen will reflect that change in real-time.

Figure 8:
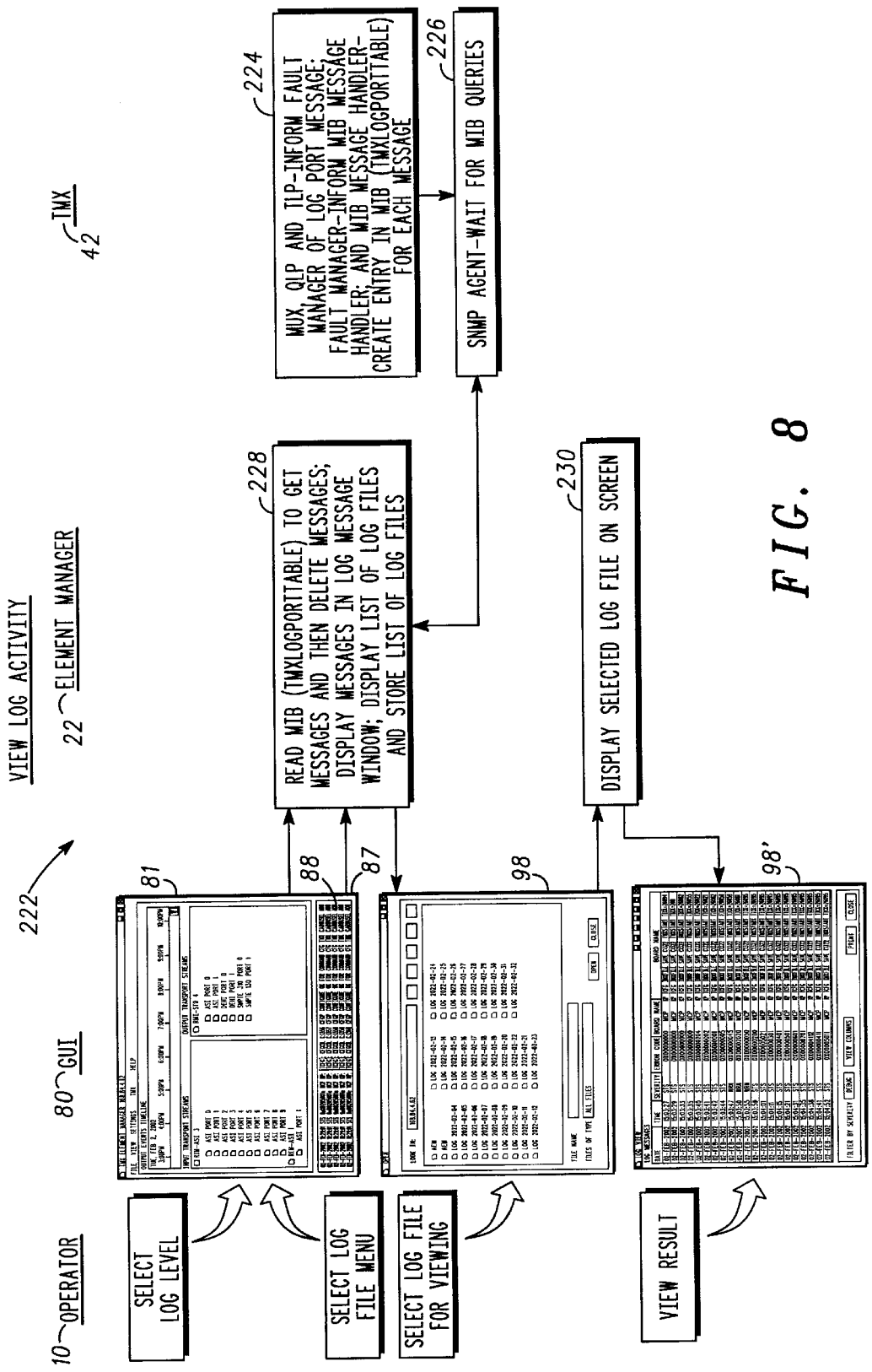
FIG. 8 illustrates certain event logging and viewing capabilities and processes in accordance with one preferred embodiment of the present invention.

FIG. 8 illustrates various event logging and viewing capabilities 222 in accordance with one preferred embodiment of the present invention. As shown therein, the system has the ability to filter the log messages displayed on the graphical user interface. Viewing log information in accordance with the present invention initially entails operator selection of an appropriate log filter level, thereby placing the system into one of four modes. The filter level is recorded by the element manager 22 and the number and type of messages displayed in the log message window 87 of graphical user interface 80 is dictated by the filter level. The desired log filter level can be selected from the "view" drop down menu item near the top of tree view screen 81 and then selecting the log messages option. There are preferably four filter levels: normal status, emergency status, fault status and debug. In debug mode all of the generated log messages are displayed.

Upon startup, the TMX chassis 42 the status query task begins to poll the system to thereby generate log messages that are used to populate the TMXLogPortTable, as shown at 224. The SNMP agent 44 then waits to respond to for queries for this information as shown at 226. This log messages can be generated by any one of the various firmware modules and element manager 22, GUI 80 and TMX chassis 42 cooperate to continually pass log messages in accordance with the previously selected log level to the graphical user interface for display in the scrolling log message window. Additionally, these log messages are stored for possible retrieval and analysis in the future. Although the log messages presented to an operator in normal use can be filtered, all log messages generated by the system are preferably stored on the element manager's host computer. One separate log file is preferably generated for each day the system is in use and operator 10 has the ability to retrieve and view log messages for any given day in the log file archive screen 98.

Upon selection of the Log File Menu by operator 10, element manager 22 retrieves, displays and stores log files as indicated at 228. This screen is accessed by selecting the "view" menu item near the top of the tree view screen 81 and by then selecting the appropriate option. Upon selection of one of the daily log files from the list of log files in the archive screen 98, individual log messages from the selected log file are displayed for viewing on screen 98' as indicated at 230. When reviewing stored log messages, the operator also has the ability to filter the information by selecting one of the four filter levels as discussed above.

Figure 9:
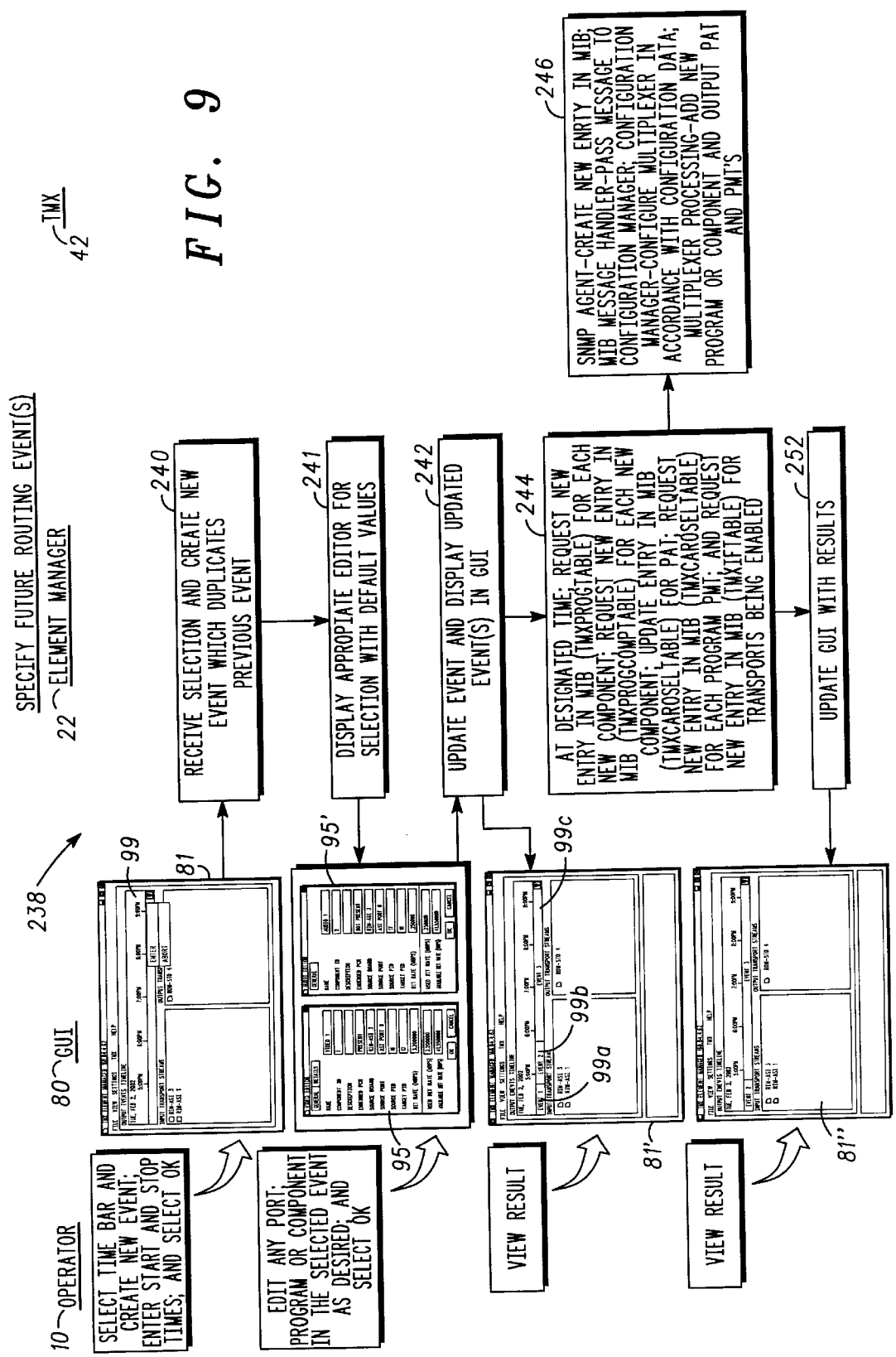
FIG. 9 illustrates specification of future content stream routing event(s) in accordance with one preferred embodiment of the present invention.

FIG. 9 illustrates various future content stream routing capabilities 238 in accordance with one preferred embodiment of the present invention. Specification of future event(s) is initially driven by operator action on the tree view screen. In particular, upon initialization and discovery of the system, the system initially sets up one routing event that spans the current time up to a predetermined time in the future (e.g., two years). This is shown in a time bar 99.

Operator 10 can then select time bar 99, as shown in the upper right hand portion of tree view screen 81. The resulting pop-up menu allows operator 10 to either modify the displayed current event or to create a new event. In the case of specifying the future routing events, operator 10 would create a new event by selecting the create new event option and by specifying start and stop times for the new event. At that point, indicated at 240, another duplicate event (by default) is created by element manager 22. This information is then sent to the graphical user interface 80 for display and possible modification as shown at 241. The particular editor that is presented to operator 10 depends on what type of event will be created. In the representative example of FIG. 9, audio and video editors 95 and 95' are presented. IP data streams could also be specified for a future routing event as will readily occur to those of ordinary skill based on the teachings contained herein. Once all of the various details for the various components of the future event has been completed, this information will be gathered by the element manager at 242 and displayed on screen 81'. As shown on screen 81', three events have been define in the illustrative example of FIG. 9. At 244, element manager 22 requests that new entries be added to certain MIB's and TMX chassis 42 executes the configuration changes at 246. Also, element manager 22 updates the GUI at 252. This results in a tree view screen 81" that is substantially similar to that of screen 81', but that displays the routing trees according to the newly executed configuration.

Preferably, none of this future event configuration data is provided to TMX chassis 42 until shortly prior to the predetermined time for commencement of the newly defined future event. Then (e.g., about 30 seconds prior to the predetermined time), the entire configuration data is sent to TMX chassis 42 for execution. This routing event data is slightly different from that discussed above with respect to FIG. 6, in that it also includes predetermined time data indicating when the new routing configuration is to occur. In this way operator 10 can configure the system to automatically change configuration routing control at future predetermined points in time, even in the absence of the operator. Thus, the system permits automated control of the inventive broadband media hardware by predetermining routing configuration information for extended time periods and enabling automatic execution of such configuration changes.

Figure 10:
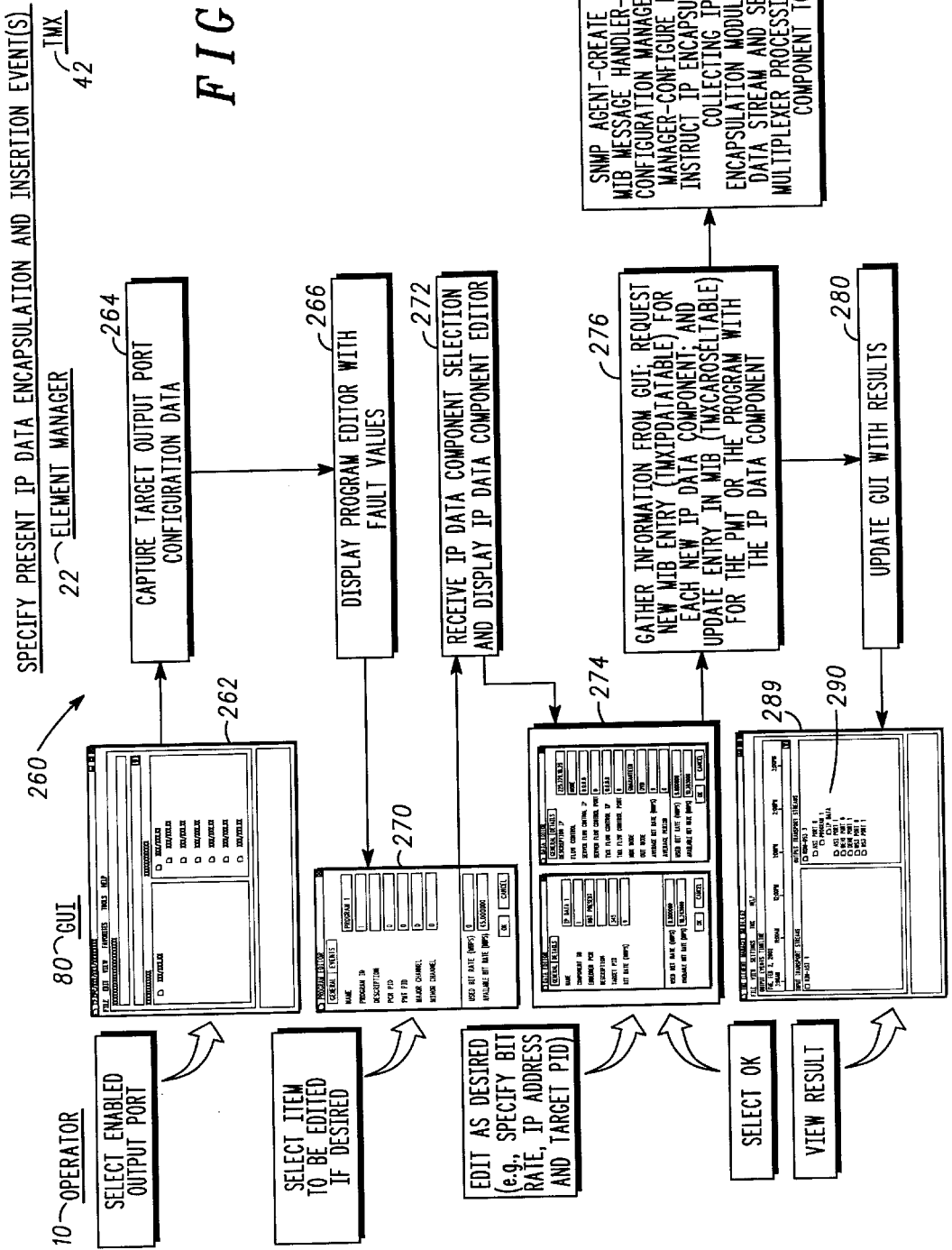
FIG. 10 illustrates various IP data encapsulation and insertion capabilities in accordance with one preferred embodiment of the present invention.

FIG. 10 illustrates various IP data encapsulation and insertion capabilities and processes 260 in accordance with one preferred embodiment of the present invention. As described in greater detail below, the present invention enables operator 10 to define and execute IP data encapsulation either manually or semi-automatically.

In particular, the preferred embodiment of the present invention provides operators with the ability to manually enter IP encapsulation configuration data element by element or, alternatively, to automatically enter IP encapsulation configuration data by dragging and dropping graphical objects to and from various locations of the tree view screen 81. Element manager 22 cooperates with graphical user interface 80 to execute the various routing commands specified by corresponding drag and drop operations. This is achieved with automated population of MIB tables corresponding to the various fields necessary to define a routing command. Drag and drop operations on graphical user interface 80 assist operator 10 in defining IP encapsulation specifications for the system in a manner substantially analogous to the semi-automatic definition of video and audio routing events shown and described with reference to FIG. 6. Those of ordinary skill in the art will readily appreciate how to extend these concepts to implement drag and drop procedures in order to achieve semi-automated IP data encapsulation based on the teachings of this specification. Manual, or element by element, IP data encapsulation techniques are described immediately below with respect to FIGS. 10 and 11.

With primary reference to FIG. 10, operator 10 can specify one or more IP data encapsulation events 260 by selecting the graphical objects representing a desired location (e.g., an enabled output port) from a tree view screen 262. Operator 10 can then select a particular program into which encapsulated IP data will be inserted. This enables element manager 22 to capture configuration data relating to the targeted output port and any programs that may be resident thereon at 264. In the representative example of FIG. 10, program 1 has been selected for insertion of an IP data component. Responsive to operator selection of program 1, element manager 22 (at 266) displays a program editor 270 and sends default output port values from the to the graphical user interface for display. Operator 10 can then enter various values relating to a program into which an IP data component will be inserted with the assistance of element manager 22 at 272. General and detailed IP data component editors 274 will then be displayed so that a variety of other parameters can be specified by operator 10. Operator 10 has the ability to edit the add/remove/change detailed information in the IP data components editors for each of the components that comprise the content stream. In particular, operator 10 has the ability to specify details such as source and destination IP addresses, bit rate, target PID, etc. for each component of the selected program in the general and detailed editor windows 274. This feature enables a user to more easily allocate bandwidth among the various IP data streams being created so that maximum bandwidth utilization can be achieved. Up to 128 IP data streams may be simultaneously specified for encapsulation and insertion in this way.

Upon selection of the "OK" button of one of windows 274, element manager 22 executes a number of functions at 276. In particular, element manager 22 gathers the edited information from the GUI and requests that various new entries be placed into certain MIB tables with default and/or edited data (as shown at 276). Element manager 22 also provides this information to TMX 42 for execution as shown at 278 of FIG. 10 and in FIG. 11. In particular, at 278, SNMP agent 44 creates the new MIB entries, message handler 45 passes the information to configuration manager 46 which configures one or more multiplexers and instructs the IP encapsulation module 66 to begin collecting IP data. IP encapsulation module 66 then receives IP data from the specified source IP address, encapsulates each IP data packet as one or more MPEG packets, to thereby form MPEG data streams, and sends them to the targeted multiplexer(s). The targeted multiplexer(s) receives the assembled MPEG data packets and stream the MPEG data appropriately. At 280, the element manager updates the graphical user interface 80 which displays the updated information on tree view screen 289. Operator 10 can then view an IP data icon 290 that indicates encapsulation and insertion of IP data is occurring.

Figure 11:
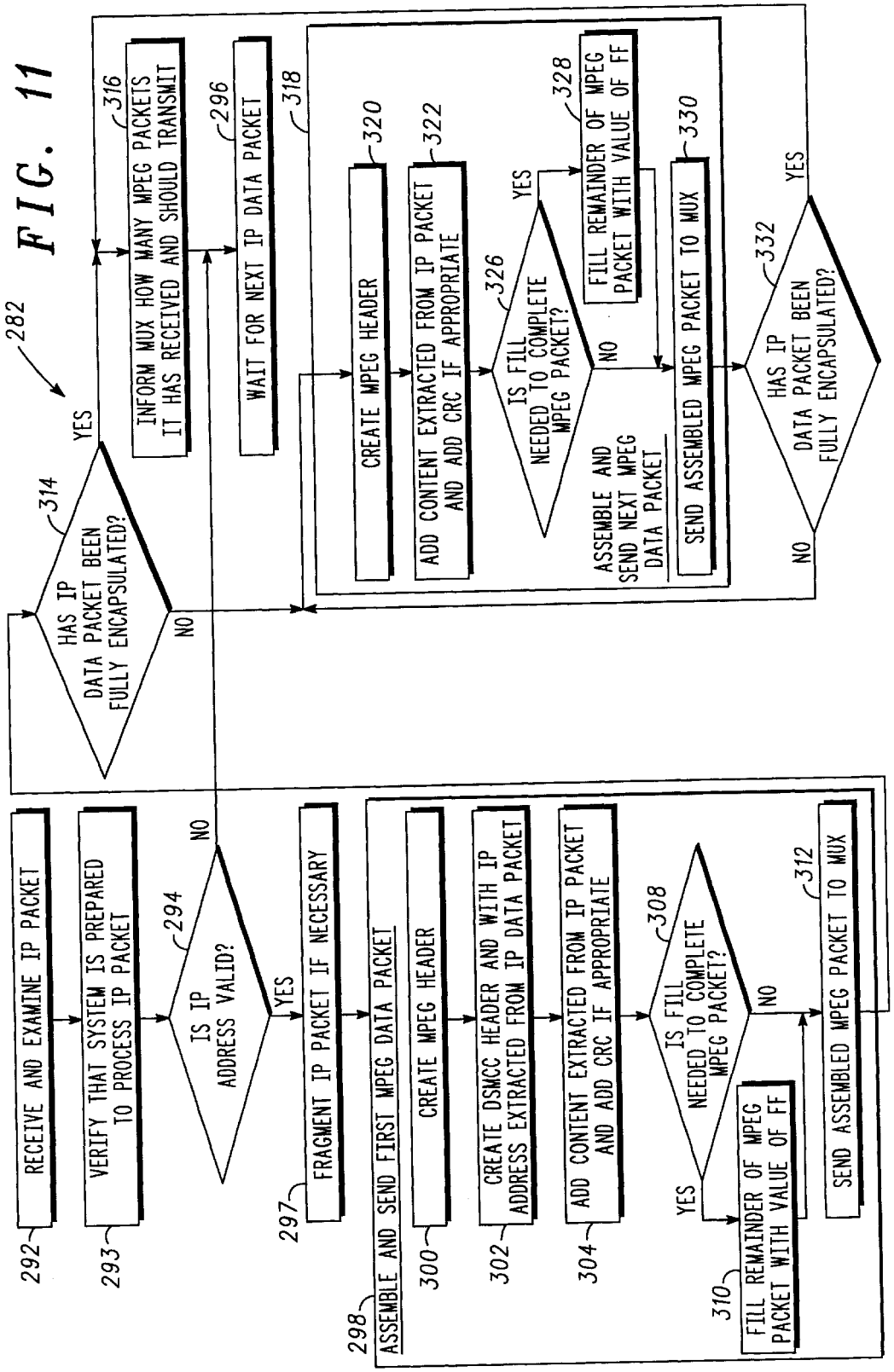
FIG. 11 is a detailed flow chart illustrating the IP data encapsulation and insertion capabilities of FIG. 10 in greater detail.

The portion of block 278 that performs the IP encapsulation process is illustrated in detail in FIG. 11. As shown therein, upon execution of IP encapsulation process 282, the encapsulation module 66 instructs IP data stack (of the operating system running on the host processor) to collect/receive and examine an IP data packet at 292. At 293 the module 66 then verifies that the system is prepared to process IP packets (e.g., the target multiplexer(s) has/have been properly configured). The destination IP address for the received IP data packet is then tested for validity at 294. In particular, the destination IP address is checked to determine whether it is the broadcast, unicast or multicast IP address. This is preferably accomplished by verifying that the destination address is within the multicast range and that the address has been specified for data collection/reception. If the IP address indicates that the IP packet is not a multicast packet, the determination is made that the IP data packet must be either a broadcast or unicast packet. If so, the data packet is passed through the operating system (OS) stack in a conventional manner and the process passes to 296 where it simply waits to receive the next IP data packet. In particular, the preferred OS (VxWorks) employs a standard seven-layer OSI compliant IP stack that processes each broadcast and/or unicast packet to determine its type and the application that it should process it. Thus, for example, a broadcast packet that is found to be an ARP request would be sent to the ARP task for processing.

Conversely, if the source IP address indicates that the IP data packet is a multicast IP packet, the packet cannot simply be routed through the OS stack because the OS will not recognize the data packet except in the unlikely event that it is the intended recipient of the packet. Thus, if the IP address indicates that the data packet is a multicast packet and if that address is one of the 128 addresses that element manage 22 has indicated as being associated with IP data that is to be encapsulated, the IP data will be converted to a different form and routed without going through the IP stack as an IP data packet. To achieve this, the process first passes to 297 where the IP data packet is fragmented, if necessary, into smaller content components for processing. The process then passes to 298 where an MPEG data packet is assembled and sent to the appropriate multiplexer(s). In particular, a 4 byte MPEG header that includes the target PID for this packet is created at 300. Then, at 302 the destination IP address is extracted from the IP data packet and used to create a 16 byte DSM-CC (Data Storage Media Command and Control) header for the first MPEG data packet. A conventional 4 byte Cyclic Redundancy Code (CRC or CRC32) MPEG suffix is preferably also included in the last MPEG packet (e.g., following the last byte of content). Since the system can support output data in either one of DVB or ASTC data formats, the DSM-CC header also indicates which format the output data is in to thereby account for the differences between these formats. At 304, up to 168 bytes of content are added to the MPEG 188 byte packet being created. If this can hold all of the content to be sent, then a CRC is appended after the last byte of content. At 308, a determination is made whether any fill data is needed to complete the MPEG packet. If so, process 282 passes to 310 where the remainder of the MPEG packet is filled with dummy data. This data is preferably the numerical value of 255 (FF in hexadecimal) and is repeated until a complete 188 byte MPEG data packet has been formed. With this system of the preferred embodiment, a maximum of one IP data packet will be inserted into a single MPEG packet. If no fill is needed (or after the packet has been filled), the process passes to 312 where the assembled packet is sent to the targeted multiplexer and it is preferably stored in a FIFO for combination with additional MPEG packets, if any. Also, the process passes to 314 where is it is determined whether or not the received IP data packet has been fully encapsulated. If so, the process passes to 316 where the multiplexer receives an indication of how many MPEG data packets it has received together with an indication that this/these packet(s) should be transmitted. The process 282 then passes to 296 where the IP encapsulation module waits for the next IP data packet to be encapsulated.

If it is determined at 314 that the IP data packet has not been fully encapsulated, process 282 passes to 318 where additional content from the IP data packets are assembled into MPEG data packets and sent to the appropriate multiplexer.

In particular, process 282 passes from 314 to 320 where an MPEG header for the next MPEG data packet is created. Up to 184 bytes of IP data and CRC (for the last MPEG packet) are then added to the packet at 322 and, at 326, a determination is made whether any fill data is needed to complete the MPEG packet. If so, process 282 passes to 328 where the remainder of the MPEG packet is filled with dummy data. This data is also preferably the numerical value of 255 (FF in hexadecimal) and is repeated until a complete 188 byte MPEG data packet has been formed. If no fill is needed (or after the packet has been filled), process 282 passes to 330 where the assembled packet is sent to the targeted multiplexer and it is preferably stored in a FIFO for combination with all prior and subsequent assembled MPEG packets, if any. Also, the process passes to 332 where is it is determined whether or not the received IP data packet has been fully encapsulated. If not, steps 320 through 332 are repeated until the entire IP data packet has been encapsulated and, eventually, the process passes to 316 and 296 as noted immediately below. If so, the multiplexer receives an indication of how many MPEG data packets it has received together with an indication that these packets should be transmitted at 316. The process then passes to 296 where the IP encapsulation module waits for the next multicast IP data packet to be encapsulated. Process 282 terminates when operator 10 specifies a different function for the subject output port or when the time period for the specified event has expired. At that point, IP encapsulation module 66 awaits further instructions from configuration manager 46.

While the present invention has been described in connection with what is presently considered to be the most practical and preferred embodiments, it is to be understood that the invention is not limited to the disclosed embodiments, but is intended to encompass the various modifications and equivalent arrangements included within the spirit and scope of the appended claims. With respect to the above description, for example, it is to be realized that the optimum implementation, function and manner of operation, assembly and use, are deemed readily apparent to one skilled in the art, and all equivalent relationships to those illustrated in the drawings and described in the specification are intended to be encompassed by the appended claims. Therefore, the foregoing is considered to be an illustrative, not exhaustive, description of the principles of the present invention.

What is claimed is:

1. A graphical user interface for providing real-time visual display of bandwidth utilization for dynamic content streams routed through a broadband media router with an input port and an output port, wherein said dynamic content streams are received by the input port and routed to the output port, the content streams having plural attributes that include variable bit rate, type and name, and the graphical user interface comprising for each of a plurality of said content streams:

a bandwidth utilization screen for displaying graphical objects representing real-time bandwidth utilization for each content stream of said plurality of said content streams, the bandwidth utilization screen comprising for each content stream of said plurality of content streams:

an input bandwidth utilization graphical object that changes in real-time as a function of the content stream;

an output bandwidth utilization graphical object that changes in real-time as a function of the content stream;

wherein:

for each content stream of said plurality of said content streams, the input bandwidth utilization graphical object and the output bandwidth utilization graphical object are displayed as attributes of a single bandwidth bar such that a separate bandwidth bar is simultaneously displayed for each content stream of said plurality of content streams.

2. The graphical user interface of claim 1 wherein the content stream comprises plural components, and wherein selection of the bandwidth bar displays a detailed bandwidth utilization window displaying attributes of all of the content stream components.

3. The graphical user interface of claim 1 wherein output bandwidth utilization is recalculated and redisplayed in real-time in response to at least one content stream attribute being modified.

4. The graphical user interface of claim 1 wherein the bandwidth utilization screen further comprises a scrolling log message window for displaying system generated log messages in real-time.

5. The graphical user interface of claim 3 wherein the broadband media router comprises a transcoder which uses a transcoder algorithm to compress the bandwidth of the content stream and wherein the display is sensitive enough to permit operators to perform a visual assessment of the transcoding algorithm efficiency.

6. The graphical user interface of claim 1 wherein the bandwidth utilization screen further comprises bandwidth minima and maxima values over a given time period.

7. The graphical user interface of claim 1 wherein the bandwidth bar is displayed in a two dimensional plane defined between a pair of scaled perpendicular axes, and wherein the axes are automatically rescaled in response to changes in the content stream attributes.

8. The graphical user interface of claim 1 wherein the bandwidth bar further comprises, for each content stream of said plurality of content streams:

a maximum input bandwidth utilization graphical object; and a minimum input bandwidth utilization graphical object.

9. A method of displaying real-time bandwidth utilization for dynamic content streams routed through a broadband media router, the content streams having attributes that vary over time, the method comprising for each of a plurality of said content streams:

displaying a graphical object representing input bandwidth utilization that changes in real-time as a function of the content stream;

displaying a graphical object representing output bandwidth utilization that changes in real-time as a function of the content stream;

displaying a graphical object representing maximum input bandwidth utilization for the content stream; and displaying a graphical object representing minimum input bandwidth utilization for the content stream;

wherein all of the graphical objects for each content stream of said plurality of content streams form a single bandwidth bar such that a separate bandwidth bar is displayed simultaneously for each content stream of said plurality of content streams.

10. The method of claim 9 further comprising varying the height of the bandwidth bar as a function of at least one of the content stream attributes.

11. The method of claim 9, wherein the content streams each comprise plural hierarchical components and wherein the method further comprises separately displaying at least one attribute of all of the plural components of one content stream in response to selection of the content stream.

12. The method of claim 11 wherein separately displaying at least one attribute of all of the plural components comprises displaying unique alphanumeric character strings obtained from the plural component streams.

\* \* \* \* \*